Patented Feb. 23, 1937

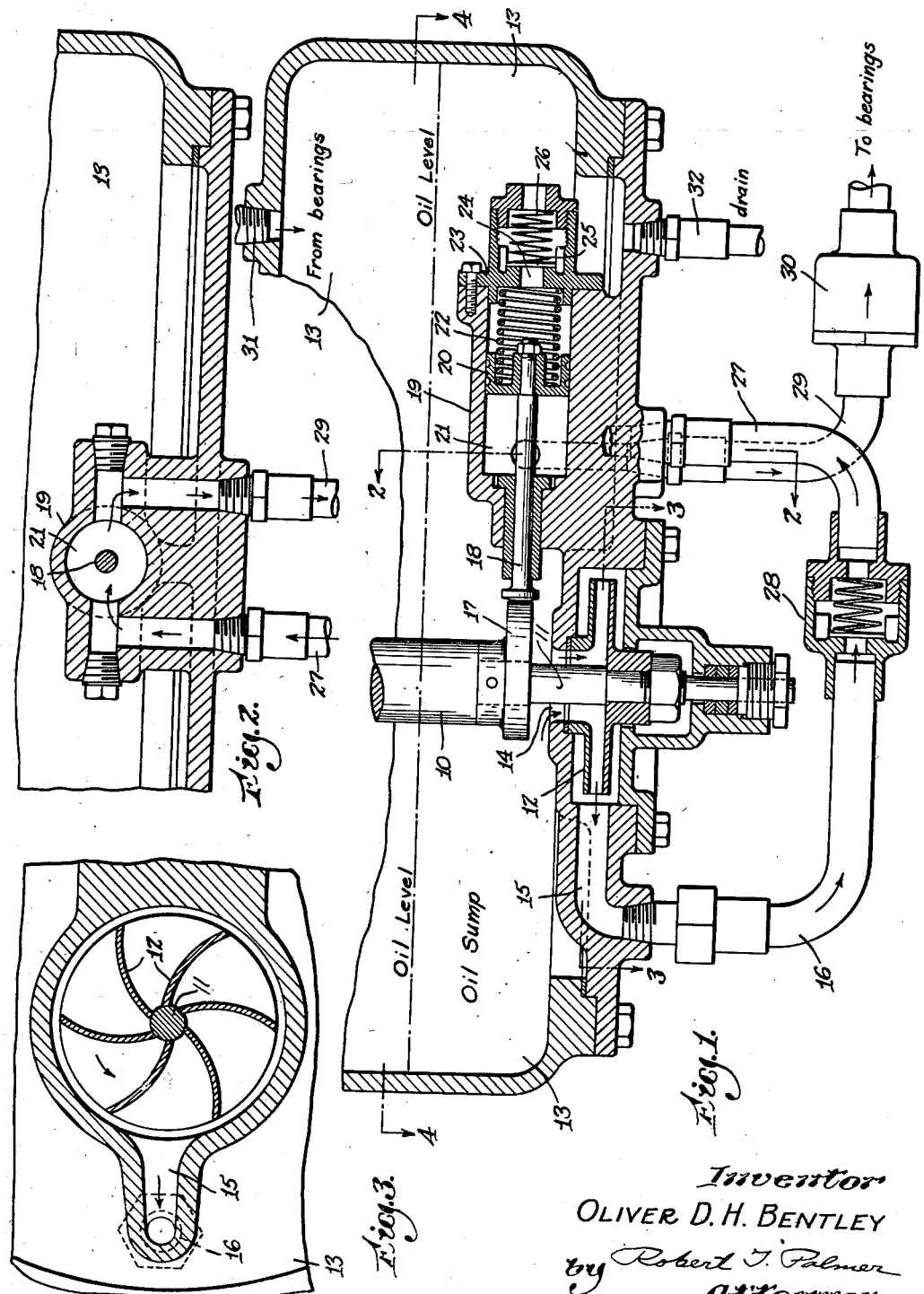

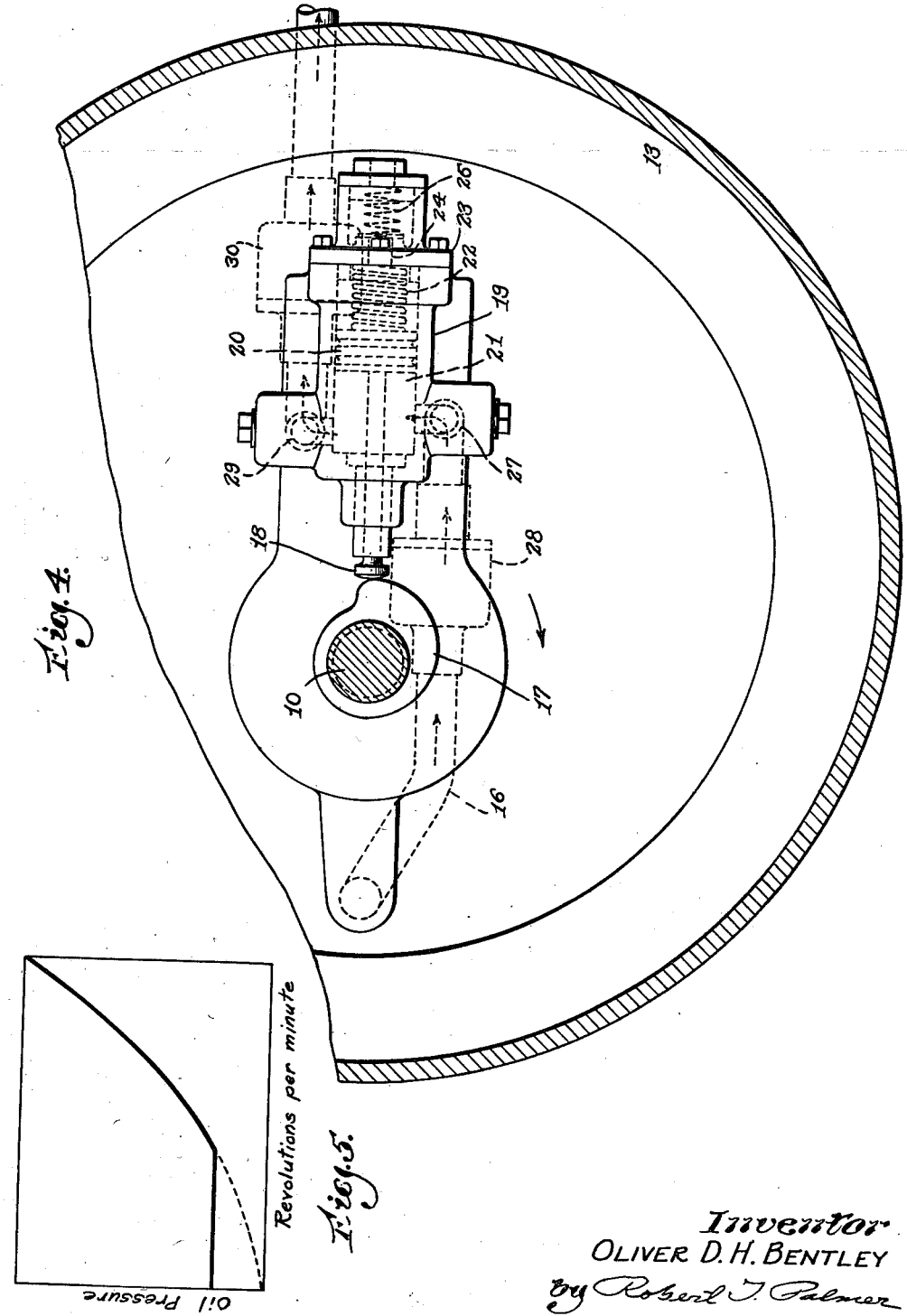

2,071,913

UNITED STATES PATENT OFFICE 2,071,913

LUBRICATION SYSTEM

Oliver D. H. Bentley, Norfolk, Mass., assignor to B. F. Sturtevant Company, Inc., Boston, Mass.

Application December 7, 1935, Serial No. 53,368

8 Claims. (Cl. 184—6)

This invention relates to lubricating systems and relates more particularly to the efficient and adequate lubrication of machinery at idling as well as at high speeds.

In some types of machinery such, for example, as steam turbines, centrifugal oil pumps are preferred for the supply of lubricant to bearings because of their desirable characteristics at the high speeds of normal operation. But where a turbine is called upon to idle for any period of time, the pressure afforded by a centrifugal pump is insufficient for adequate lubrication.

According to this invention, a centrifugal pump and a plunger or piston type of pump cooperate to provide a satisfactory minimum pressure at idling speeds and the desired pressure at high speeds.

In one embodiment of this invention, a cam driven plunger pump and a centrifugal pump are arranged in series relationship. The piston of the plunger pump works against a spring which acts to return the piston on its back stroke until an oil pressure corresponding to the spring pressure is built up in the cylinder of the pump at which point the piston ceases to reciprocate. Thus, a predetermined fixed pressure is provided by this type of pump. The oil at this fixed pressure flows through the centrifugal pump, which at idling speeds delivers in itself practically no pressure, and is at the predetermined minimum pressure provided by this combination of pumps. As the speed of the turbine increases, the pressure provided by the centrifugal pump increases accordingly but that provided by the piston pump remains unchanged. The result is that the piston pump provides the desired lubricating pressure at low or idling speeds and the centrifugal pump provides the desired pressures at operating speeds.

An object of the invention is to provide a lubricating system for a variable speed machine, which will deliver a predetermined minimum pressure.

Another object of the invention is to provide a lubricating system for a variable speed machine, which will provide lubricant pressures proportional to speeds of rotation down to a predetermined minimum pressure.

Other objects of the invention will be apparent from the following description taken together with the drawings.

The invention will now be described with reference to the drawings, of which:

Fig. 1 is a side sectional view through a lubricating system according to this invention;

Fig. 2 is a sectional view along the lines 2—2 of Fig. 1, and shows details of the piston pump;

Fig. 3 is a sectional view along the lines 3—3 of Fig. 1, and shows details of the centrifugal pump;

Fig. 4 is a sectional view along the lines 4—4 of Fig. 1, and

Fig. 5 is a chart illustrating the characteristics of a lubricating system according to this invention.

The embodiment of the invention illustrated, has been selected as applied to a steam turbine and provides lubrication for the bearings of the turbine which in itself is not illustrated since forming no part of this invention.

Referring now to Fig. 1, the shaft 10 of the rotating machine, the bearings of which are to be lubricated, has mounted on an extension 11 thereof, the centrifugal blades 12. Oil from the sump 13, through the base of which the shaft 10 extends, enters the circular opening 14 around the shaft extension 11 and through movement of the vanes passes out the channel 15 connecting with the tube 16.

Mounted on the shaft 10 is the cam 17 which upon rotation of the shaft actuates the plunger 18 of the piston pump indicated generally by the numeral 19. The piston 20 is mounted on one end of the plunger 18 and is reciprocated thereby with the cylinder 21 upon rotation of the shaft 10. Opposing displacement of the piston 20 by the plunger 18 is the coil spring 22 which acts upon recession of the cam 17 to return the piston 20 to the point in the cylinder 21 at which it begins its stroke.

The back side of the cylinder 21 is closed off by the plate 23 having the opening 24 closed off by the valve disc 25 under pressure of the spring 26. The opening 24, valve disc 25 and spring 26 cooperate to permit oil to be exhausted from the back or spring side of the piston 20 on the forward stroke of the piston and to prevent the sucking of oil into the cylinder 21 at the back or spring side of the piston on its back stroke when returned by the spring 22.

The suction tube 27 to the piston pump 19 connects with the tube 16 leading from the discharge channel 15 of the centrifugal pump, through the check valve 28 which permits the oil flow only in the direction indicated by the arrows.

The discharge tube 29 leads from the cylinder 21 of the piston pump through the check valve 30 to the bearing or bearings to be lubricated. The oil returned from the bearing or bearings enters the upper portion of the sump 13 through the inlet tube 31. The tube 32 is for draining the sump 13 when this is desired.

In operation, assuming first that the turbine is operating at idling speed, the centrifugal pump is ineffective to provide substantial oil pressure. It is not desired, however, that the oil pressure fall below say 3 pounds' pressure regardless of how slow the turbine idles. The piston pump 19 is designed to provide a constant pressure of 3 pounds regardless of the speed of rotation of the turbine.

Below say 800 revolutions per minute, the centrifugal pump is unable to provide as much as 3 pounds' pressure. At say 800 revolutions per minute, the centrifugal pump provides 3 pounds' pressure, and at speeds above 800 revolutions per minute, the pressures provided by the centrifugal pump rise rapidly. All this is illustrated by the graph of Fig. 5. The dotted line indicates the pressures that would be provided by the centrifugal pump alone at speeds below 800 revolutions per minute. The horizontal heavy line indicates the constant pressure provided by the piston pump alone, and the curve extending above the horizontal line indicates the oil pressures provided by the centrifugal pump at speeds above 800 revolutions per minute. It is seen from this that the overall performance of the combined centrifugal and piston pump is indicated by the heavy line made up by the horizontal line and the curve extending above it.

The operation of the piston pump 19 in delivering a constant pressure will now be described. At pressures below 3 pounds the spring 22 maintains a greater pressure against the piston 20 than is provided by the oil in the cylinder 21 acting on the other side of the piston. As a result, as the cam 17 recedes, the free end of the plunger 18 is caused by the spring 22 to remain in contact with the cam following its movement and reciprocating the piston. Thus, as the piston 20 moves towards the right (facing Fig. 1 of the drawings) on its forward stroke, the suction caused by the movement of the piston in the cylinder 21 causes oil to enter the cylinder through the inlet tube 27. Oil is prevented from entering the cylinder from the outlet tube 29 by the check valve 30. On the back stroke of the piston under the pressure of the spring 22 and the recession of the cam 17, the piston forces the oil in the cylinder 21 into the outlet pipe 29 to the bearing or bearings to be lubricated, the check valve 28 preventing the oil from being forced through the inlet tube 16.

As the plunger 18 continues to follow the cam 17, a pressure above 3 pounds tends to be built up, but when this 3 pounds' pressure is exceeded, the oil pressure acting on one side of the piston 20 exceeds the pressure of the spring 22 acting on its other side with the result that on the next recession of the cam 17, the plunger 18 does not follow it and remains out of contact with the cam until the oil pressure drops again to 3 pounds. The plunger 18 thus contacts intermittently to maintain the desired oil pressure.

During the above described action when the turbine is idling, the centrifugal pump is rotating and the oil is passing in series through it, the piston pump, the bearings and sump.

At speeds of rotation above 800 revolutions per minute the centrifugal pump provides the desired oil pressures which are then above the 3 pounds minimum. These high oil pressures pass through the cylinder 21 of the piston pump 19 and exert a greater pressure on the piston 20 than is provided by the spring 22 with the result that at speeds above 800 revolutions per minute, the plunger 18 does not follow the cam 17 and the piston pump 19 is inoperative.

Whereas one embodiment of the invention has been described for the purpose of illustration, it should be understood that the invention is not to be limited to the exact arrangement described as many departures may be made by those skilled in the art after having had access to this disclosure.

What is claimed is:

1. In combination, a machine having a bearing to be lubricated, a shaft rotated during operation of said machine, means operated by said shaft for delivering oil to said bearing at high pressures during high speeds of rotation of said shaft, and separate means operated by said shaft for delivering oil at a constant low pressure to said bearing at low speeds of rotation of said shaft, said means cooperating to maintain a pressure above a predetermined minimum oil pressure at said bearing.

2. In combination, a machine having a bearing to be lubricated, a shaft rotated during operation of said machine, means rotated by said shaft for delivering oil to said bearing at high pressures during high speeds of rotation of said shaft, and separate means operated by said shaft for delivering oil at a constant low pressure to said bearing at low speeds of rotation of said shaft, said means cooperating to maintain a pressure above a predetermined minimum oil pressure at said bearing.

3. In combination, a machine having a bearing to be lubricated, a shaft rotated during operation of said machine, means operated by said shaft for delivering oil to said bearing at high pressures during high speeds of rotation of said shaft, and separate means reciprocated by said shaft for delivering oil at a constant low pressure to said bearing at low speeds of rotation of said shaft, said means cooperating to maintain a pressure above a predetermined minimum oil pressure at said bearing.

4. In combination, a machine having a bearing to be lubricated, a shaft rotated during operation of said machine, means rotated by said shaft for delivering oil to said bearing at high pressures during high speeds of rotation of said shaft, and separate means reciprocated by said shaft for delivering oil at a constant low pressure to said bearing at low speeds of rotation of said shaft, said means cooperating to maintain a pressure above a predetermined minimum oil pressure at said bearing.

5. In combination, a machine having a bearing to be lubricated, a shaft rotated during operation of said machine, an oil supply, a centrifugal oil pump rotated by said shaft, a piston oil pump operated by said shaft, and means connecting said centrifugal oil pump, said piston oil pump, said oil supply and said bearing in series relationship.

6. In combination, a machine having a bearing to be lubricated, a shaft rotated during operation of said machine, an oil supply, a centrifugal oil pump rotated by said shaft, a piston oil pump operated by said shaft, means connecting said centrifugal oil pump, said piston oil pump, said oil supply and said bearing in series relationship, and means for rendering said piston pump inoperative at a predetermined oil pressure.

7. In combination, a machine having a bearing to be lubricated, a shaft rotated during operation of said machine, an oil supply, a centrifugal oil pump rotated by said shaft, a piston oil pump operated by said shaft, means connecting said centrifugal oil pump, said piston oil pump, said oil supply and said bearing in series relationship, and means for maintaining the pressure delivered by said piston pump at a predetermined low pressure.

8. In combination, a machine having a bearing to be lubricated, a shaft rotated during operation of said machine, an oil supply, a centrifugal oil pump rotated by said shaft, a piston oil pump operated by said shaft, means connecting said centrifugal oil pump, said piston oil pump, said oil supply and said bearing in series relationship, and means for maintaining the pressure delivered by said piston pump at a predetermined low pressure and for rendering said piston pump inoperative at pressures delivered by said centrifugal pump above said predetermined low pressure.

OLIVER D. H. BENTLEY.